United States Patent
Ranjan et al.

(10) Patent No.: US 12,524,049 B2
(45) Date of Patent: Jan. 13, 2026

(54) POWER BUS SYSTEM

(71) Applicant: The Boeing Company, Arlington, VA (US)

(72) Inventors: Rajeev Ranjan, Bangalore (IN); Hector R Cedillo, Tustin, CA (US); Nishanth Beedu, Bangalore (IN); Animesh Mukherjee, Bangalore (IN)

(73) Assignee: THE BOEING COMPANY, Arlington, VA (US)

( * ) Notice: Subject to any disclaimer, the term of this patent is extended or adjusted under 35 U.S.C. 154(b) by 171 days.

(21) Appl. No.: 18/296,442

(22) Filed: Apr. 6, 2023

(65) Prior Publication Data
US 2024/0338068 A1    Oct. 10, 2024

(51) Int. Cl.
| | | |
|---|---|---|
| G06F 1/26 | (2006.01) | |
| G06F 1/32 | (2019.01) | |
| G06F 1/3234 | (2019.01) | |
| G06F 1/3287 | (2019.01) | |

(52) U.S. Cl.
CPC .............. G06F 1/26 (2013.01); G06F 1/3253 (2013.01); G06F 1/3287 (2013.01)

(58) Field of Classification Search
None
See application file for complete search history.

(56) References Cited

U.S. PATENT DOCUMENTS

| | | | | |
|---|---|---|---|---|
| 8,705,253 B2* | 4/2014 | Roman | ............. | H02M 3/33523 |
| | | | | 363/21.02 |
| 2009/0168472 A1* | 7/2009 | Chung | ................ | H02M 3/1584 |
| | | | | 363/50 |
| 2010/0110733 A1* | 5/2010 | Lim | ..................... | H02M 3/3353 |
| | | | | 363/20 |
| 2013/0020872 A1* | 1/2013 | Kinnard | .................. | G06F 1/263 |
| | | | | 307/64 |
| 2016/0195580 A1* | 7/2016 | Zeng | ......................... | G06F 1/26 |
| | | | | 324/750.01 |
| 2017/0099011 A1* | 4/2017 | Freeman | ................ | H02M 7/06 |
| 2017/0170733 A1* | 6/2017 | Ferencz | ............ | H02M 3/33571 |
| 2017/0366093 A1* | 12/2017 | Wambsganss | ...... | H02M 1/4241 |
| 2019/0029086 A1* | 1/2019 | Wang | ................. | H05B 45/3725 |
| 2020/0006250 A1* | 1/2020 | Hill | ........................ | H01L 23/645 |
| 2021/0344217 A1* | 11/2021 | Shaikh | ...................... | G06F 1/28 |
| 2021/0408911 A1* | 12/2021 | Upadhyaya | ......... | H02M 1/0009 |
| 2022/0209672 A1* | 6/2022 | Zhong | ...................... | H02M 3/01 |
| 2022/0337171 A1* | 10/2022 | Morrison | .............. | H02M 1/007 |
| 2023/0409095 A1* | 12/2023 | Lu | ............................. | G06F 1/20 |
| 2023/0418348 A1* | 12/2023 | Stiedl | .................... | H02M 7/217 |
| 2024/0388124 A1* | 11/2024 | Huang | .................... | H02J 9/061 |

* cited by examiner

Primary Examiner — Jaweed A Abbaszadeh
Assistant Examiner — Cheri L Harrington
(74) Attorney, Agent, or Firm — Moore IP Law (57) ABSTRACT

A power bus system for supplying electric power to a load includes a first power bus circuit coupled to a first power source and including a first primary inductor, a second power bus circuit coupled to a second power source and including a second primary inductor, and a third power bus circuit coupled to the load and including a first secondary inductor electrically connected in series with a second secondary inductor. The first primary inductor and the first secondary inductor are arranged as a first transformer, the second primary inductor and the second secondary inductor are arranged as a second transformer, and the first power bus circuit is electrically isolated from the second power bus circuit.

20 Claims, 4 Drawing Sheets

POWER BUS SYSTEM

INTRODUCTION

Wiring and interconnect systems for aircraft include power cables for transferring electric power, control cables for transmitting control signals to actuators, and monitoring cables for transmitting signal data from sensors and actuators. The monitoring cables may also be used to interconnect systems, thus enabling them to share data, coordinate sequencing and execute in different orders. The power cables provide electrical power to various systems, some of which may be remotely located. Wire cables may be physically arranged in wiring harness bundles that may group electrical power cables, monitoring cables and control cables in close proximity. Design rules and separation rules may be used to physically and electrically separate certain wire cables that provide critical information from other cables. For example, flight-by-wire wire cables are fully segregated and run completely independent from other harnesses and wiring.

Guidelines may define design assurance levels (DAL) that describe critical components for safe flight operation to prevent occurrence of a fault. By way of example, power supply architectures for critical avionic applications may employ dual power inputs to provide system redundancy.

Known system architectures may not support power sharing between the two input power sources to supply electric power to a load. As such, there is a need for a system, apparatus, and/or method for providing dual power inputs to provide system redundancy.

SUMMARY

The concepts described herein provide a system, apparatus, and/or method for an aircraft that provides a power supply architecture having redundancy to avoid a fault condition that may lead to a loss of electric power to a system or device disposed at a remote location.

An aspect of the disclosure may include a power bus system for supplying electric power to a load that includes a first power bus circuit coupled to a first power source and including a first primary inductor, a second power bus circuit coupled to a second power source and including a second primary inductor, and a third power bus circuit coupled to the load, and including a first secondary inductor electrically connected in series with a second secondary inductor. The first primary inductor and the first secondary inductor are arranged as a first transformer, the second primary inductor and the second secondary inductor are arranged as a second transformer, and the first power bus circuit is electrically isolated from the second power bus circuit.

Another aspect of the disclosure may include the third power bus circuit being a first rectifier connected to an output of the first secondary inductor, and a second rectifier connected to an output of the second secondary inductor.

Another aspect of the disclosure may include the first power source being a first input bus, and the second power source being a second input bus, and wherein the first input bus is electrically isolated from the second power source.

Another aspect of the disclosure may include the first power bus circuit being physically isolated from the second power bus circuit.

Another aspect of the disclosure may include a first secondary coil being arranged in series with a first secondary switch and arranged in parallel with the first primary inductor, and a second secondary coil being arranged in series with a second secondary switch and arranged in parallel with the second primary inductor, wherein the controller is operatively connected to the first secondary switch and the second secondary switch.

Another aspect of the disclosure may include a current sensor being arranged to monitor electrical current in the third power bus circuit, wherein the current sensor is in communication with the controller.

Another aspect of the disclosure may include the first power bus circuit and the second power bus circuit acting in concert to transfer electric power to the third power bus circuit.

Another aspect of the disclosure may include the first power bus circuit and the second power bus circuit being independently controllable to transfer electric power to the third power bus circuit.

Another aspect of the disclosure may include the first power bus circuit being controllable to transfer electric power to the third power bus circuit upon occurrence of a fault in the second power bus circuit.

Another aspect of the disclosure may include the second power bus circuit being controllable to transfer electric power to the third power bus circuit upon occurrence of a fault in the first power bus circuit.

Another aspect of the disclosure may include a first control switch being arranged in series with the first primary inductor, a second control switch being arranged in series with the second primary inductor, and a controller being operatively connected to the first control switch and the second control switch.

Another aspect of the disclosure may include a power bus system for an aircraft that includes a first power bus circuit being coupled to a first power source and including a first primary inductor, a second power bus circuit being coupled to a second power source and including a second primary inductor, and a third power bus circuit including a first secondary inductor electrically connected in series with a second secondary inductor. The first primary inductor and the first secondary inductor are arranged as a first transformer, and the second primary inductor and the second secondary inductor are arranged as a second transformer.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail to avoid obscuring the disclosure. For purposes of convenience and clarity only, directional terms such as top, bottom, left, right, up, over, above, below, beneath, rear, and front, may be used with respect to the drawings. These and similar directional terms are not to be construed to limit the scope of the disclosure.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality.

Figure 1:
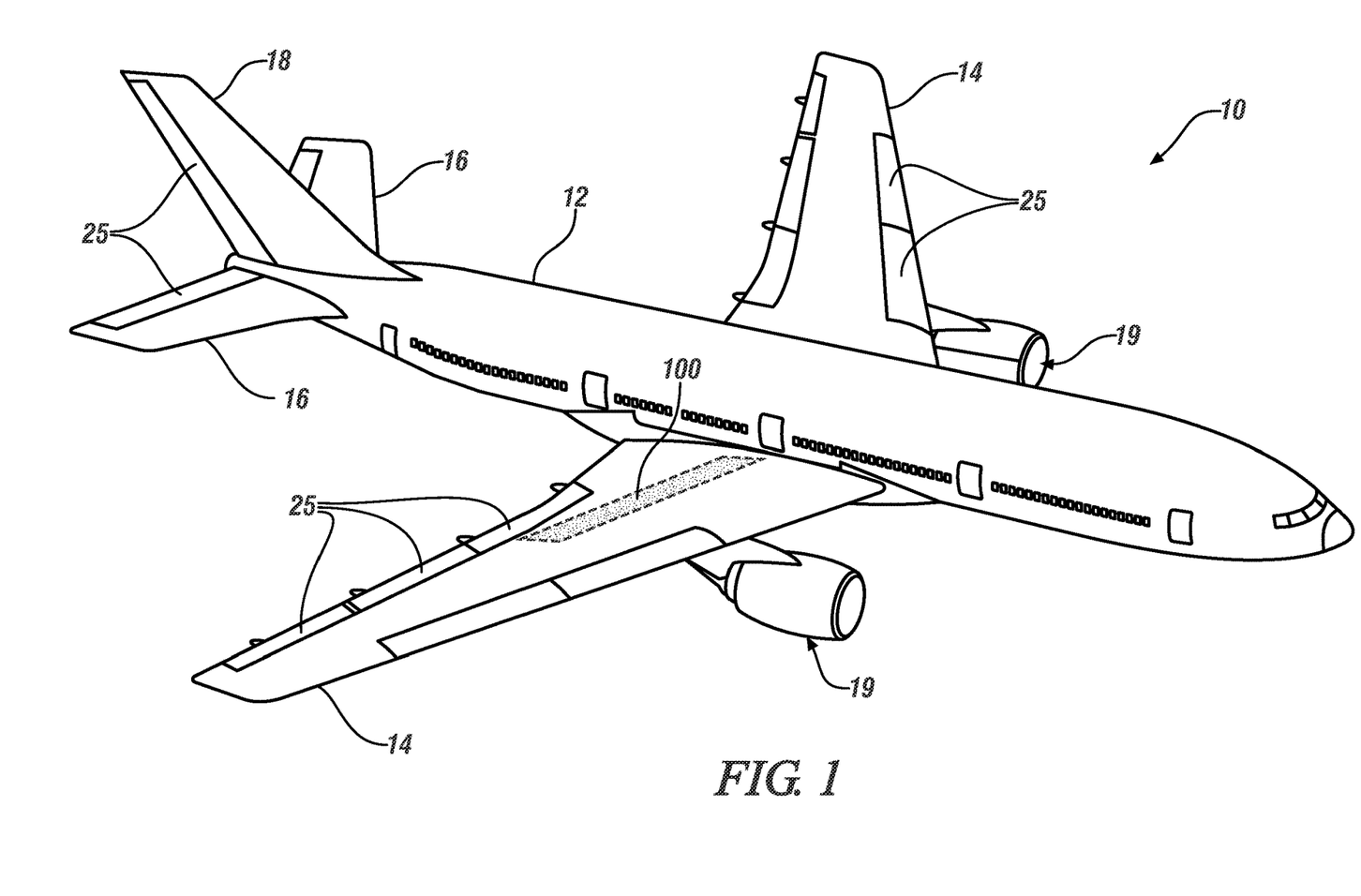
FIG. 1 schematically illustrates an aircraft that includes a power bus system, in accordance with the disclosure.

FIG. 1 schematically illustrates a fixed wing aircraft 10 that may include and utilize one or more power bus systems 100 for supplying electric power to a load, such as described hereinbelow. Aircraft 10 includes a fuselage 12, one or more wings 14, a horizontal stabilizer 16, and a vertical stabilizer 18. The aircraft 10 also includes one or more turbine engines 19. Each of the one or more wings 14, horizontal stabilizer 16, and vertical stabilizer 18 includes a moveable surface 25 that is arranged on an outside skin of the aircraft 10. The moveable surfaces 25 include, e.g., flaps, ailerons, elevators, stabilizers, etc. The movement or displacement of one or more of the moveable surfaces 25 is powered via an embodiment of the power bus system 100. A single one of the power bus systems 100 is illustrated. It is appreciated that each of the moveable surfaces 25 may be operated by a load in the form of an electrically-powered actuator or electric machine that is powered via one of the power bus systems 100. Examples of the aircraft 10 include an airplane, a commercial aircraft, and/or a military aircraft. Alternatively, the concepts described herein may be employed as a propulsion device on a flying car, a drone, an electric vertical takeoff and landing vehicle (eVTOL), etc. Alternatively, the concepts described herein may be employed as a propulsion device on a marine system.

Figure 2:
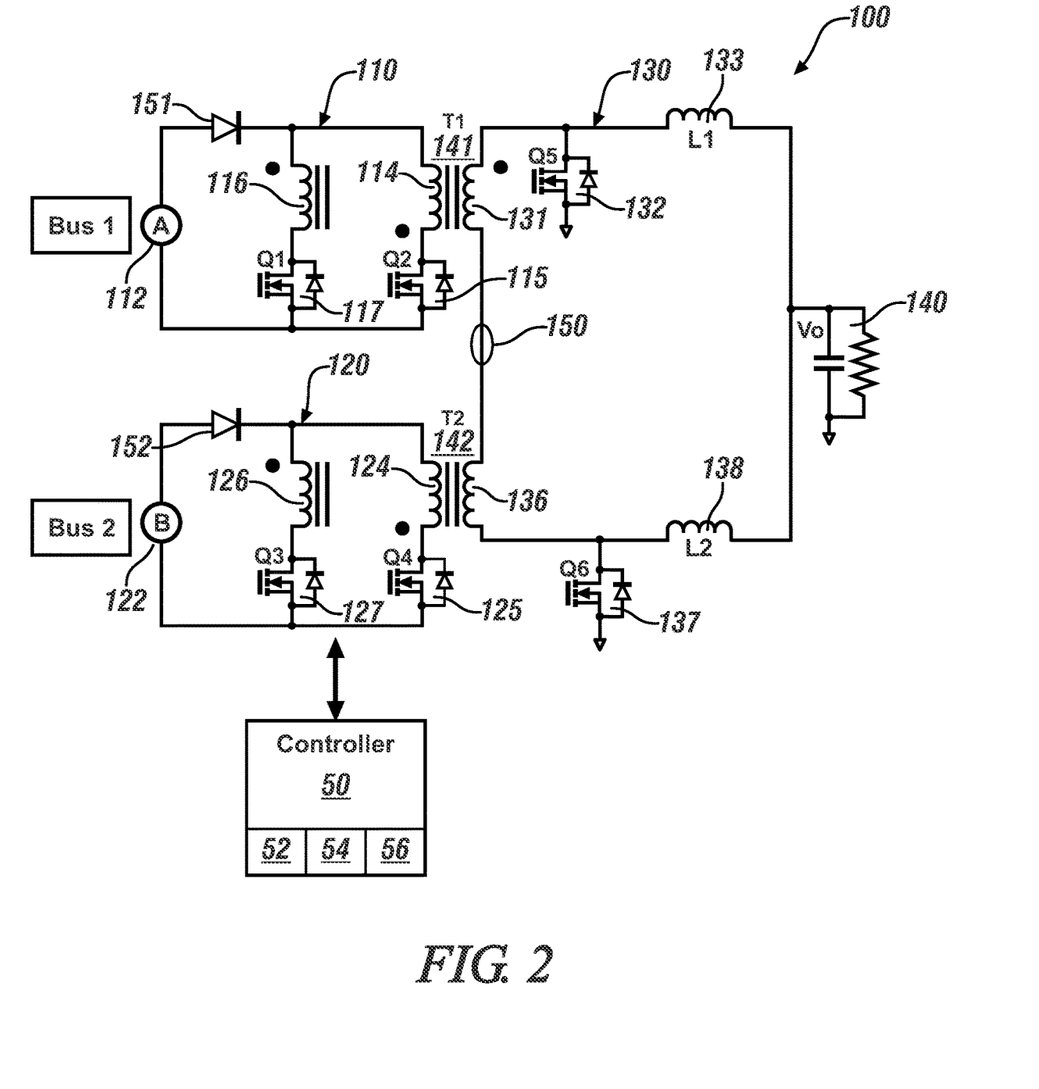
FIG. 2 schematically illustrates an embodiment of power bus system for supplying electric power to a load, including on an aircraft, in accordance with the disclosure.

FIG. 2 schematically illustrates details of an embodiment of the power bus system 100 for supplying electric power to a load, including on an aircraft, e.g., as described with reference to FIG. 1.

The power bus system 100 includes a first power bus circuit 110, a second power bus circuit 120, and a third power bus circuit 130, which are electrically coupled to a load 140. A controller 50 is arranged to monitor and control elements of the power bus system 100. The power bus system 100 transfers or otherwise conveys electric power from one or both a first power source 112 and a second power source 122 to the load 140. The first power source 112 may be in the form of a first power bus, and the second power source 122 may be in the form of a second power bus.

The first power bus circuit 110 includes a first primary inductor 114 that is electrically coupled to the first power source 112. The first primary inductor 114 is arranged in series with a first control switch 115, and is arranged in series with the first power source 112. A first secondary coil 116 and first secondary switch 117 are arranged in parallel with the first primary inductor 114. Current flow through the first primary inductor 114 is controlled by activation of the first control switch 115, and current flow through the first secondary coil 116 is controlled by activation of the first secondary switch 117.

The second power bus circuit 120 includes a second primary inductor 124 that is electrically coupled to a second power source 122. The second primary inductor 124 is arranged in series with a second control switch 125, and arranged in series with the second power source 122. A second secondary coil 126 and second secondary switch 127 are arranged in parallel with the second primary inductor 124. Current flow through the second primary inductor 124 is controlled by activation of the second control switch 125, and current flow through the second secondary coil 126 is controlled by activation of the second secondary switch 127.

The third power bus circuit 130 includes a first secondary inductor 131 electrically connected in series with a second secondary inductor 136 and electrically coupled to a load 140. A current sensor 150 is arranged to monitor current flow in the third power bus circuit 130, between the first secondary inductor 131 and the second secondary inductor 136 in one embodiment. This arrangement facilitates power sharing between the first and second power sources 112, 122. Other elements may include a first in-line coil 133, a second in-line coil 138, a third rectifier switch 132 that shorts to ground when activated, and a fourth rectifier switch 137 that shorts to ground when activated.

The first primary inductor 114 and the first secondary inductor 131 form a first transformer T1 141. The second primary inductor 124 and the second secondary inductor 136 form a second transformer T2 142. The first power source 112 is electrically isolated from the second power source 122 by the first transformer T1 141 and the second transformer T2 142. The first power bus circuit 110 is electrically isolated and physically isolated from the second power bus circuit 120. The first power bus circuit 110 is electrically isolated and physically isolated from the third power bus circuit 130. The second power bus circuit 120 is electrically isolated and physically isolated from the third power bus circuit 130.

The controller 50 includes input/output and signal processing circuitry 52, a memory device 54 storing one or a plurality of executable algorithms and one or multiple calibrations for controlling activation and deactivation of the aforementioned switches, and a processor 56. Activations of the first control switch 115, the first secondary switch 117, the second control switch 125, the second secondary switch 127, the third rectifier switch 132, and the fourth rectifier switch 137 are controlled by the controller 50.

Figure 3:
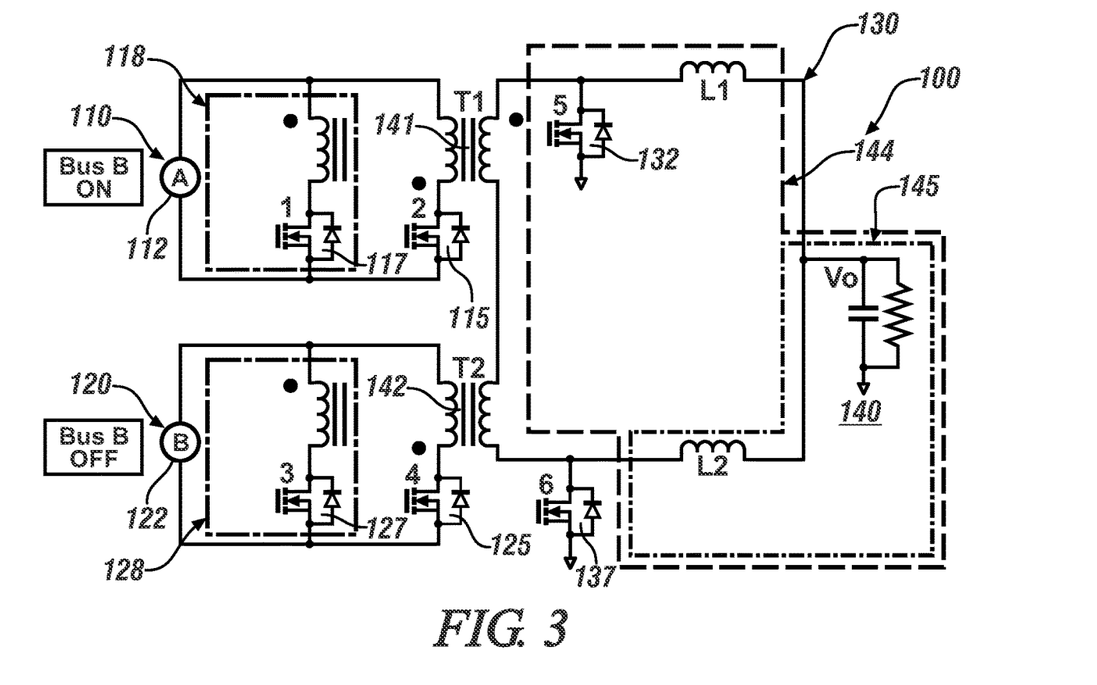
FIG. 3 schematically illustrates power flow in a power bus system for supplying electric power to a load, wherein both a first power source and a second power source are active and supplying electric power to the power bus system, in accordance with the disclosure.

FIG. 3 schematically illustrates an embodiment of the power bus system 100 described with reference to FIG. 1, including first power source 112, first power bus circuit 110, second power source 122, second power bus circuit 120, third power bus circuit 130, first transformer T1 141, second transformer T2 142, and load 140. In this depiction, both the first power source 112 and the second power source 122 are active and supplying electric power to the power bus system 100, and is illustrated with a first power flow line 118 associated with the first power bus circuit 110, and a second power flow line 128 associated with the second power bus circuit 120. Electric power is transferred from the first power source 112 through the first power bus circuit 110 to the third power bus circuit 130 via the first transformer T1 141. Electric power is transferred from the second power source 122 through the second power bus circuit 120 to the third power bus circuit 130 via the second transformer T2 142. The third power bus circuit 130 includes a power path 144 and a ground path 145. Corresponding activations and deactivations of the first control switch 115, the first secondary switch 117, the second control switch 125, the second secondary switch 127, the third rectifier switch 132, and the fourth rectifier switch 137 (illustrated with reference to FIG. 2) are controlled by the controller 50.

When both input power sources 112, 122 are present, active, and functional, the first and second transformers 141 T1 and 142 T2 are working as voltage transformers and energy is transferred from primary to secondary from both the input sources. Activations of the first control switch 115, the first secondary switch 117, the second control switch 125, the second secondary switch 127, the third rectifier switch 132, and the fourth rectifier switch 137 are controlled by the controller 50 in synchronized manner with the gate pulses from the single controller present on the secondary side. Active power sharing occurs on both the input sources 112, 122 irrespective of their voltage levels.

Figure 4:
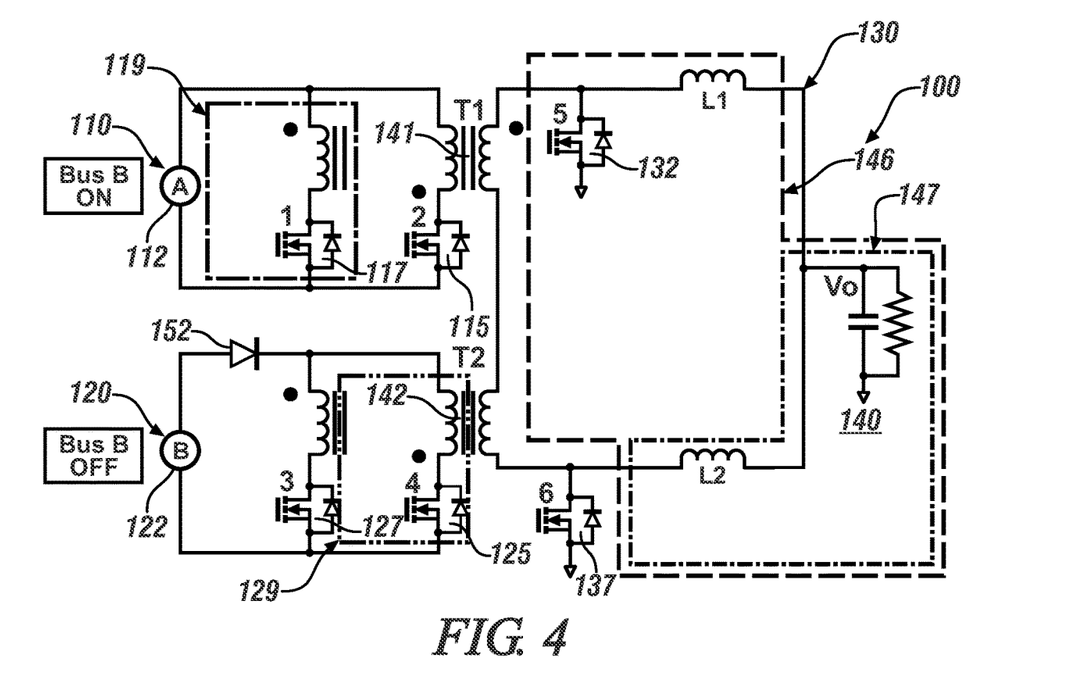
FIG. 4 schematically illustrates power flow in a power bus system for supplying electric power to a load, wherein only a first power source is active and supplying electric power to the power bus system, in accordance with the disclosure.

FIG. 4 schematically illustrates an embodiment of the power bus system 100 described with reference to FIG. 1, including first power source 112, first power bus circuit 110, second power source 122, second power bus circuit 120, third power bus circuit 130, first transformer T1 141, second transformer T2 142, and load 140. In this depiction, the first power source 112 is active and supplying electric power to the first power bus circuit 110, as illustrated with second power flow line 119 associated with the first power bus circuit 110, and the second power source 122 is inactive, as illustrated with a second power flow line 129 associated with the second power bus circuit 120.

Electric power is transferred from the first power source 112 through the first power flow line 118 via first diode 151 to the third power bus circuit 130 via the first transformer T1 141. Electric power may be transferred via the second transformer T2 142 from the third power bus circuit 130 to the second power bus circuit 120, but is isolated from the second power source 122 by second diode 152. The third power bus circuit 130 includes a power path 146 and a ground path 147. Corresponding activations and deactivations of the first control switch 115, the first secondary switch 117, the second control switch 125, the second secondary switch 127, the third rectifier switch 132, and the fourth rectifier switch 137 (illustrated with reference to FIG. 2) are controlled by the controller 50.

When the second power source 122 is not available, the first transformer T1 141 is working as a voltage transformer and energy transfer is from the first power source 112 to the load 140, and the second transformer T2 142 is working as a current transformer with the energy transfer from the secondary to primary. Activations of the first control switch 115, the first secondary switch 117, the second control switch 125, the second secondary switch 127, the third rectifier switch 132, and the fourth rectifier switch 137 are controlled by the controller 50. Activations of the first control switch 115, the first secondary switch 117, the second control switch 125, the second secondary switch 127, the third rectifier switch 132, and the fourth rectifier switch 137 are controlled by the controller 50. This includes 125 127 the second control switch Q4 125 and the second secondary switch Q3 127 being controlled to provide the current path for the second transformer T2 142 to operate as a current transformer. This operation results is low losses on the primary side of the second transformer T2 142, with lesser effect on efficiency during single bus operation.

Although not illustrated, when the first power source 112 is not available, the second transformer T2 142 is working as a voltage transformer and energy transfer is from the second power source 122 to the load 140, and the first transformer T1 141 is working as a current transformer with the energy transfer from the secondary to primary.

Figure 5:
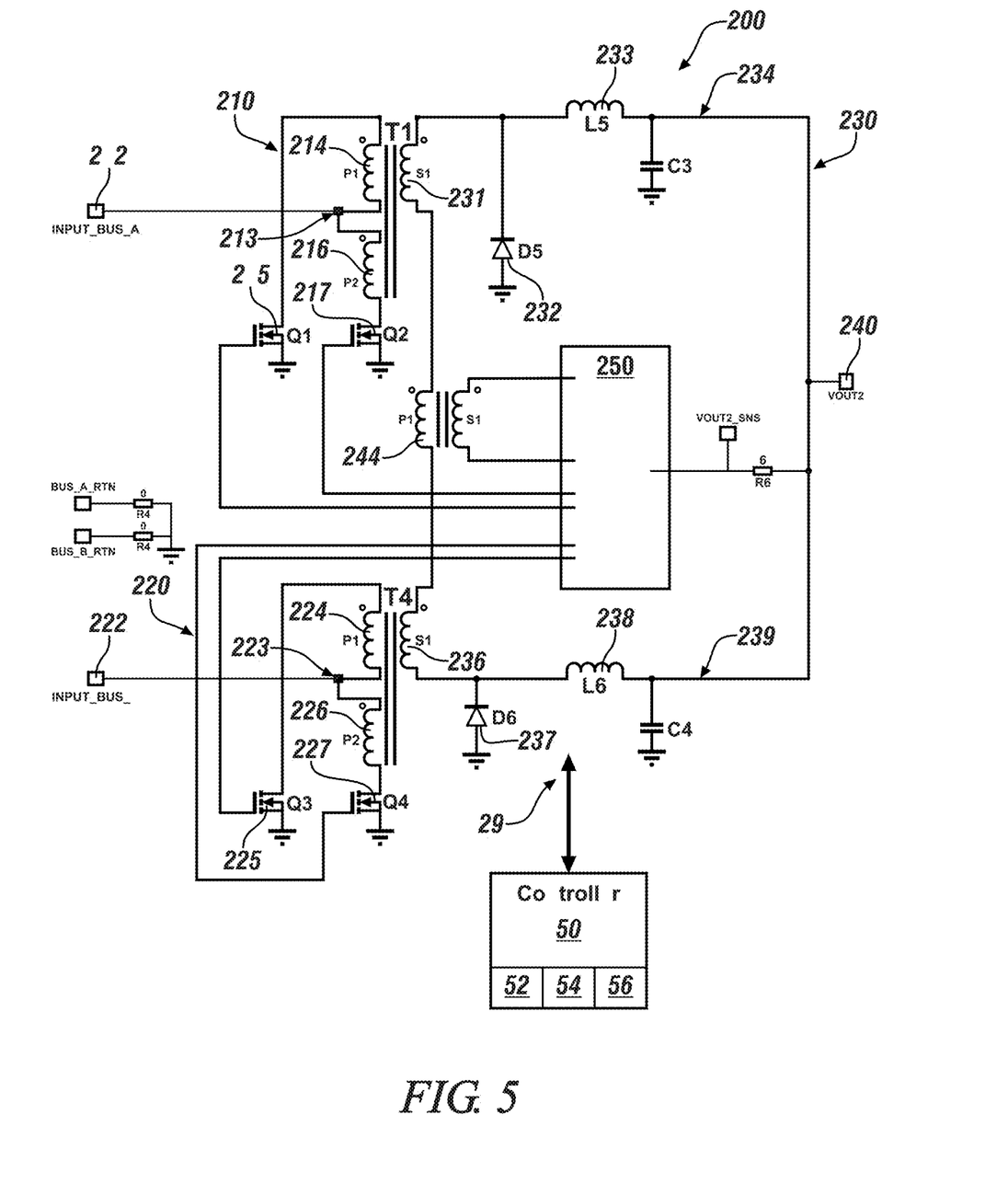
FIG. 5 schematically illustrates another embodiment of a power bus system for supplying electric power to a load, including on an aircraft, in accordance with the disclosure.

FIG. 5 schematically illustrates details of another embodiment of the power bus system 200 for supplying electric power to a load, including on an aircraft, e.g., as described with reference to FIG. 1.

The power bus system 200 includes a first power bus circuit 210, a second power bus circuit 220, and a third power bus circuit 230 and electrically coupled to a load 240. A controller 250 is arranged to monitor and control elements of the power bus system 200. The power bus system 200 transfers or otherwise conveys electric power from one or both a first power source 212 and a second power source 222 to the load 240. The first power source 212 may be in the form of a first power bus, and the second power source 222 may be in the form of a second power bus. The load 240 may be another, e.g., third power bus, that supplies electric power to remotely disposed actuators, controllers, etc.

The first power bus circuit 210 includes a first primary inductor 214 connected in series with a first secondary coil 216 at a first junction 213, with the first power source 212 being electrically coupled to the first junction 213. The first primary inductor 214 is arranged in series with a first control switch 215, which connects to ground. The first secondary coil 216 is arranged in series with a first secondary switch 217, which connects to ground. Current flow through the first primary inductor 214 is controlled by activation of the first control switch 215, and current flow through the first secondary coil 216 is controlled by activation of the first secondary switch 217.

The second power bus circuit 220 includes a second primary inductor 224 connected in series with a second secondary coil 226 at a second junction 223, with the second power source 222 being electrically coupled to the second junction 223. The second primary inductor 224 is arranged in series with a second control switch 225, which connects to ground. The second secondary coil 226 is arranged in series with a second secondary switch 227, which connects to ground. Current flow through the second primary inductor 224 is controlled by activation of the second control switch 225, and current flow through the second secondary coil 226 is controlled by activation of the second secondary switch 227.

The third power bus circuit 230 includes a first secondary inductor 231 electrically connected in series with a second secondary inductor 236 and electrically coupled to a load 240, which may be a secondary circuit. A current sensor 244 is arranged to monitor current flow in the third power bus circuit 230, between the first secondary inductor 231 and the second secondary inductor 236 in one embodiment. This arrangement facilitates power sharing between the first and second power sources 212, 222. Other elements may include a first rectifier 234 composed as a first diode 232 connected to ground, a first in-line coil 233 and a capacitor connected to ground, a second rectifier 239 composed as a second diode 237 connected to ground, and a second in-line coil 238 and a capacitor connected to ground.

The first primary inductor 214 and the first secondary inductor 231 form a first transformer T1 241. The second primary inductor 224 and the second secondary inductor 236 form a second transformer T2 242. The first power source 212 is electrically isolated from the second power source 222 by the first transformer T1 241 and the second transformer T2 242. The first power bus circuit 210 is electrically isolated and physically isolated from the second power bus circuit 220. The first power bus circuit 210 is electrically isolated and physically isolated from the third power bus circuit 230. The second power bus circuit 220 is electrically isolated and physically isolated from the third power bus circuit 230.

The controller 250 includes input/output and signal processing circuitry 52, a memory device 54 storing one or a plurality of executable algorithms and one or multiple calibrations for controlling activation and deactivation of the aforementioned switches, and a processor 56. Activations of the first control switch 215, the first secondary switch 217, the second control switch 225, and the second secondary switch 227 are controlled by the controller 250.

As described herein, the first input bus is electrically isolated from the second input bus by the first and second transformers T1 and T2. The secondary sides of the first and second transformers are connected in series for power sharing between the input buses. A single feedback control based upon current is arranged on the secondary side, resulting in improved bus transient response. The transformers T1 and T2 operate in a dual mode as voltage-fed transformers when both the input sources are present. One of the transformers T1 and T2 operates as a current-fed transformer when one of the input sources is not available. This arrangement facilitates improved efficiency operation due to a non-cascaded power supply architecture with active power sharing between the two input power sources. Power is supplied to the load that is coupled to the secondary side even when one of the input buses is out of regulation, has a fault, or is otherwise not available. This may result in higher reliability compared to present-day systems due to reduced low part count and lesser stress because of power sharing. This may further result in higher efficiency, lower cost, and a lower physical footprint compared to present-day systems.

The concepts described herein provide that a single fault does not result in drawing more than four times the steady state current. Furthermore, the concepts described herein provide physical and electrical isolation between the power inputs, to eliminate or mitigate propagation of a fault in one of the power input buses.

The concepts described herein provide there a sufficient mechanical gap between the first and second input buses to reduce risk that a manufacturing defect, e.g., solder splash, results in a system-wide fault.

The use of ordinals such as first, second and third does not imply a ranked sense of order, but rather may only distinguish between multiple instances of an act or structure.

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which can be accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as discrete, analog and/or digitized analog signals, sinusoidal-wave, triangular-wave, square-wave, vibration, and the like, that is capable of traveling through a medium.

A parameter is defined as a measurable quantity that represents a physical property of a device or other element that is discernible using one or more sensors and/or a physical model. A parameter can have a discrete value, e.g., either "1" or "0", or can be infinitely variable in value.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. A power bus system for supplying electric power to a load, comprising:
   a first power bus circuit coupled to a first power source and including a first primary inductor;
   a second power bus circuit coupled to a second power source and including a second primary inductor; and
   a third power bus circuit coupled to the load, and including:

a first secondary inductor having a first end and a second end, the first end electrically coupled to the load; and a second secondary inductor having a third end and a fourth end, the second secondary inductor electrically connected in series with the first secondary inductor via a particular electrical connection between the second end and the third end, the particular electrical connection distinct from the load, wherein the fourth end is electrically coupled to the load, wherein the first primary inductor and the first secondary inductor are arranged as a first transformer, wherein the second primary inductor and the second secondary inductor are arranged as a second transformer, wherein the first power bus circuit is electrically isolated from the second power bus circuit, and wherein the third power bus circuit is configured to provide a shared power from both the first power source and the second power source.

2. The power bus system of claim 1, wherein the third power bus circuit further comprises a first rectifier connected to an output of the first secondary inductor, and a second rectifier connected to an output of the second secondary inductor.

3. The power bus system of claim 1, wherein the first power source comprises a first input bus, and the second power source comprises a second input bus, and wherein the first input bus is electrically isolated from the second power source.

4. The power bus system of claim 1, wherein the first power bus circuit is physically isolated from the second power bus circuit.

5. The power bus system of claim 1, further comprising:
a first secondary coil arranged in series with a first secondary switch, and arranged in parallel with the first primary inductor;
a second secondary coil arranged in series with a second secondary switch, and arranged in parallel with the second primary inductor; and
a controller, wherein the controller is operatively connected to the first secondary switch and the second secondary switch.

6. The power bus system of claim 5, further comprising a current sensor arranged to monitor electrical current in the third power bus circuit, wherein the current sensor is in communication with the controller.

7. The power bus system of claim 1, wherein the first power bus circuit and the second power bus circuit act in concert to transfer electric power to the third power bus circuit.

8. The power bus system of claim 1, wherein the first power bus circuit and the second power bus circuit are independently controllable to transfer electric power to the third power bus circuit.

9. The power bus system of claim 1, wherein the first power bus circuit is controllable to transfer electric power to the third power bus circuit upon occurrence of a fault in the second power bus circuit.

10. The power bus system of claim 1, wherein the second power bus circuit is controllable to transfer electric power to the third power bus circuit upon occurrence of a fault in the first power bus circuit.

11. The power bus system of claim 1, further comprising:
a first control switch arranged in series with the first primary inductor;
a second control switch arranged in series with the second primary inductor; and a controller, operatively connected to the first control switch and the second control switch.

12. A power bus system for an aircraft, comprising:
a first power bus circuit coupled to a first power source and including a first primary inductor;
a second power bus circuit coupled to a second power source and including a second primary inductor; and
a third power bus circuit including:
a first secondary inductor having a first end and a second end, the first end electrically coupled to a load; and
a second secondary inductor having a third end and a fourth end, the second secondary inductor electrically connected in series with the first secondary inductor via a particular electrical connection between the second end and the third end, the particular electrical connection distinct from the load, wherein the fourth end is electrically coupled to the load, wherein the first primary inductor and the first secondary inductor are arranged as a first transformer, wherein the second primary inductor and the second secondary inductor are arranged as a second transformer, and wherein the third power bus circuit is configured to provide a shared power from both the first power source and the second power source.

13. The power bus system of claim 12, wherein the third power bus circuit further comprises a first rectifier connected to an output of the first secondary inductor, and a second rectifier connected to an output of the second secondary inductor.

14. The power bus system of claim 12, wherein the first power source comprises a first input bus, and the second power source comprises a second input bus, and wherein the first input bus is electrically isolated from the second power source.

15. The power bus system of claim 12, wherein the first power bus circuit is physically isolated and electrically isolated from the second power bus circuit.

16. The power bus system of claim 12, further comprising:
a first secondary coil arranged in series with a first secondary switch, and arranged in parallel with the first primary inductor;
a second secondary coil arranged in series with a second secondary switch, and arranged in parallel with the second primary inductor; and
a controller, wherein the controller is operatively connected to the first secondary switch and the second secondary switch.

17. The power bus system of claim 16, further comprising a current sensor arranged to monitor electrical current in the third power bus circuit, wherein the current sensor is in communication with the controller.

18. The power bus system of claim 12, wherein the first power bus circuit and the second power bus circuit act in concert to transfer electric power to the third power bus circuit.

19. The power bus system of claim 12, wherein the first power bus circuit and the second power bus circuit are independently controllable to transfer electric power to the third power bus circuit.

20. The power bus system of claim 12, further comprising:
a first control switch arranged in series with the first primary inductor;
a second control switch arranged in series with the second primary inductor; and a controller, operatively connected to the first control switch and the second control switch.

* * * * *